(12) United States Patent
Hino et al.

(10) Patent No.: US 9,992,385 B2
(45) Date of Patent: Jun. 5, 2018

(54) OPTICAL SCANNER, IMAGE DISPLAY DEVICE, AND HEAD MOUNTED DISPLAY

(71) Applicant: Seiko Epson Corporation, Tokyo (JP)

(72) Inventors: Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 15/229,507

(22) Filed: Aug. 5, 2016

(65) Prior Publication Data

US 2017/0041511 A1   Feb. 9, 2017

(30) Foreign Application Priority Data

Aug. 6, 2015 (JP) ................... 2015-155764

(51) Int. Cl.
| | |
|---|---|
| *H04N 3/08* | (2006.01) |
| *G09G 3/02* | (2006.01) |
| *G02B 27/01* | (2006.01) |
| *G02B 26/10* | (2006.01) |
| *H04N 9/31* | (2006.01) |

(52) U.S. Cl.
CPC ............. *H04N 3/08* (2013.01); *G02B 26/105* (2013.01); *G02B 27/0149* (2013.01); *G09G 3/025* (2013.01); *H04N 9/31* (2013.01)

(58) Field of Classification Search
CPC . H04N 3/08; H04N 9/31; G09G 3/025; G02B 27/0149; G02B 26/105
See application file for complete search history.

(56) References Cited

U.S. PATENT DOCUMENTS

| | | | | |
|---|---|---|---|---|
| 2004/0085604 A1* | 5/2004 | Ikegame | ............... | G02B 6/359 359/201.1 |
| 2008/0127374 A1* | 5/2008 | Davies | ................ | C07K 14/415 800/298 |
| 2008/0180771 A1* | 7/2008 | Watanabe | .............. | H02K 33/12 359/199.1 |
| 2010/0251420 A1* | 9/2010 | Davies | ................ | C07K 14/415 800/278 |
| 2011/0195174 A1* | 8/2011 | Davies | ................ | C07K 14/415 426/622 |
| 2012/0033280 A1* | 2/2012 | Mizoguchi | ........... | G02B 26/085 359/199.3 |

(Continued)

FOREIGN PATENT DOCUMENTS

| | | |
|---|---|---|
| JP | 2008-170565 A | 7/2008 |
| JP | 2008-275829 A | 11/2008 |
| JP | 2014-098729 A | 5/2014 |

*Primary Examiner* — Brian P Yenke
*Assistant Examiner* — Sean N. Haiem
(74) *Attorney, Agent, or Firm* — Harness, Dickey & Pierce, P.L.C.

(57) ABSTRACT

An optical scanner includes a movable section, shaft sections configured to support the movable section to be capable of swinging, a supporting section configured to support the shaft sections, a holding section joined to the upper surface of the movable section, a light reflecting section provided in the holding section, a wire provided on the lower surface of the supporting section, and a projecting section provided on the lower surface of the movable section. The supporting section, the movable section, and the shaft sections are formed from the same substrate.

18 Claims, 14 Drawing Sheets

(56) References Cited

U.S. PATENT DOCUMENTS

| | | | | |
|---|---|---|---|---|
| 2012/0062969 A1* | 3/2012 | Watanabe | ............ | G02B 26/105 359/198.1 |
| 2012/0086996 A1* | 4/2012 | Mizoguchi | ............. | H04N 1/113 359/198.1 |
| 2012/0151628 A1* | 6/2012 | Davies | ................ | C07K 14/415 800/278 |
| 2013/0101727 A1* | 4/2013 | Davies | ................ | C07K 14/415 426/635 |
| 2013/0278985 A1* | 10/2013 | Hino | .................. | G02B 26/105 359/199.3 |
| 2013/0301099 A1* | 11/2013 | Mizoguchi | ........... | G02B 26/085 359/221.2 |
| 2013/0301100 A1* | 11/2013 | Mizoguchi | ......... | G02B 26/0816 359/221.2 |
| 2014/0126034 A1* | 5/2014 | Ozaki | ................ | G02B 26/0841 359/224.1 |
| 2014/0268266 A1* | 9/2014 | Shimizu | ............... | G02B 26/101 359/200.1 |
| 2015/0277109 A1* | 10/2015 | Mizoguchi | ........... | G02B 26/105 359/200.2 |
| 2016/0002653 A1* | 1/2016 | Davies | ................ | C07K 14/415 426/618 |
| 2016/0021009 A1* | 1/2016 | Hui | .................... | H04L 43/0876 370/235 |
| 2017/0038578 A1* | 2/2017 | Mizoguchi | ........... | G02B 26/101 |
| 2017/0052366 A1* | 2/2017 | Yamano | ................ | G02B 26/101 |

* cited by examiner

OPTICAL SCANNER, IMAGE DISPLAY DEVICE, AND HEAD MOUNTED DISPLAY

BACKGROUND

1. Technical Field

The present invention relates to an optical scanner, an image display device, and a head mounted display.

2. Related Art

JP-A-2008-170565 (Patent Literature 1) discloses an optical scanner that scans light. The optical scanner disclosed in Patent Literature 1 includes a movable section including a mirror surface and a supporting section that supports the movable section to be capable of vibrating. The optical scanner vibrates the movable section to scan the light reflected on the mirror surface.

In the optical scanner disclosed in Patent Literature 1, a first functional element and a wire for the first functional element are provided on the front surface of the optical scanner. A second functional element and a wire for the second functional element are provided on the rear surface of the optical scanner. In the optical scanner having such a configuration, if it is necessary to pressurize and join another member on the front surface, the second functional element and the wire for the second functional element are likely to be damaged by pressure during the pressurization and joining. Conversely, if it is necessary to pressurize and join another member on the rear surface, the first functional element and the wire for the first functional element are likely to be damaged by pressure during the pressurization and joining. In this way, the optical scanner disclosed in Patent Literature 1 is unsuitable to be pressurized and joined with another member.

SUMMARY

An advantage of some aspects of the invention is to provide an optical scanner, an image display device, and a head mounted display that can reduce damage to a wire when pressurization and joining are performed.

An optical scanner according to an aspect of the invention includes: a movable section; a shaft section configured to support the movable section to be capable of swinging around a swing axis; a supporting section configured to support the shaft section; a holding section joined to one surface of the movable section; a light reflecting section provided in the holding section and having light reflectivity; a wire provided on a surface side opposite to a surface of the supporting section on which the holding section is provided; and a projecting section provided on a surface opposite to the surface of the movable section on which the holding section is provided. The supporting section, the movable section, and the shaft section are formed from the same substrate.

By providing the projecting section in this way, it is possible to suppress projection of only the wire. It is possible to reduce damage to the wire during pressurization and joining.

In the optical scanner according to the aspect of the invention, it is preferable that a surface on the opposite side of a surface of the projecting section joined to the substrate and a surface on the opposite side of a surface of the wire joined to the substrate are located flush with each other.

With this configuration, it is possible to more effectively reduce the damage to the wire during the pressurization and joining.

In the optical scanner according to the aspect of the invention, it is preferable that, in a plan view of the substrate, a surface on the opposite side of a surface of the projecting section joined to the substrate is located in a position apart from the substrate compared with a surface on the opposite side of a surface of the wire joined to the substrate.

With this configuration, it is possible to more effectively reduce the damage to the wire during the pressurization and joining.

In the optical scanner according to the aspect of the invention, it is preferable that a clearance in the thickness direction of the movable section between the surface on the opposite side of the surface of the projecting section joined to the substrate and the surface on the opposite side of the surface of the wire joined to the substrate is smaller than the thickness of the wire.

With this configuration, it is possible to prevent excessive projection of the projecting section.

In the optical scanner according to the aspect of the invention, it is preferable that the movable section and the holding section are joined via a joining member.

With this configuration, it is possible to easily and firmly join the movable section and the holding section.

In the optical scanner according to the aspect of the invention, it is preferable that the projecting section and the wire are formed in the same film forming process.

With this configuration, it is easy to form the projecting section.

An image display device according to another aspect of the invention includes the optical scanner according to the aspect of the invention.

With this configuration, it is possible to obtain the image display device having high reliability.

A head mounted display according to still another aspect of the invention includes: the optical scanner according to the aspect of the invention; and a frame mounted with the optical scanner and worn on the head of an observer.

With this configuration, it is possible to obtain the head mounted display having high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of an optical scanner, an image display device, and a head mounted display according to the invention are explained below with reference to the accompanying drawings.

First Embodiment

First, an image display device according to a first embodiment of the invention is explained.

Figure 1:
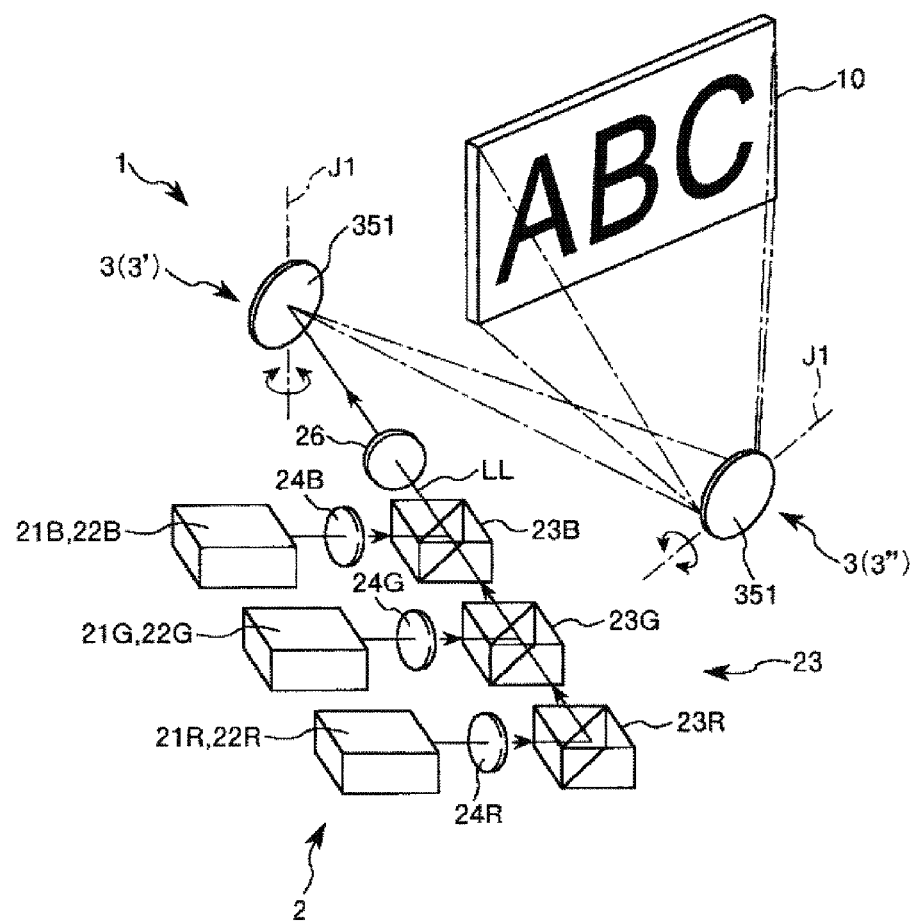
FIG. 1 is a configuration diagram of an image display device according to a first embodiment of the invention.
Figure 2:
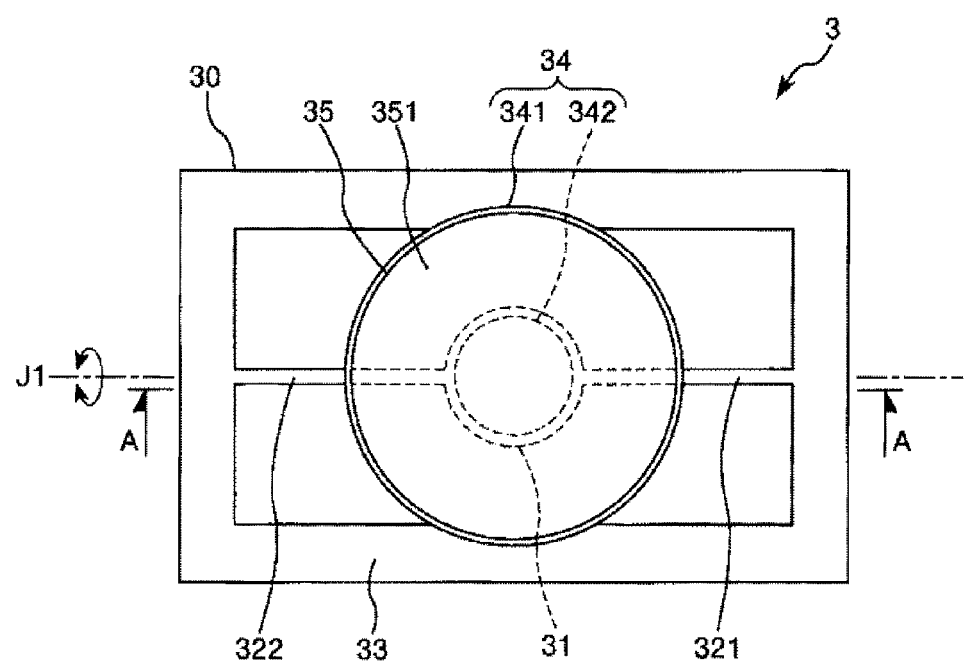
FIG. 2 is a plan view (a top view) of an optical scanner included in the image display device shown in FIG. 1.
Figure 3:
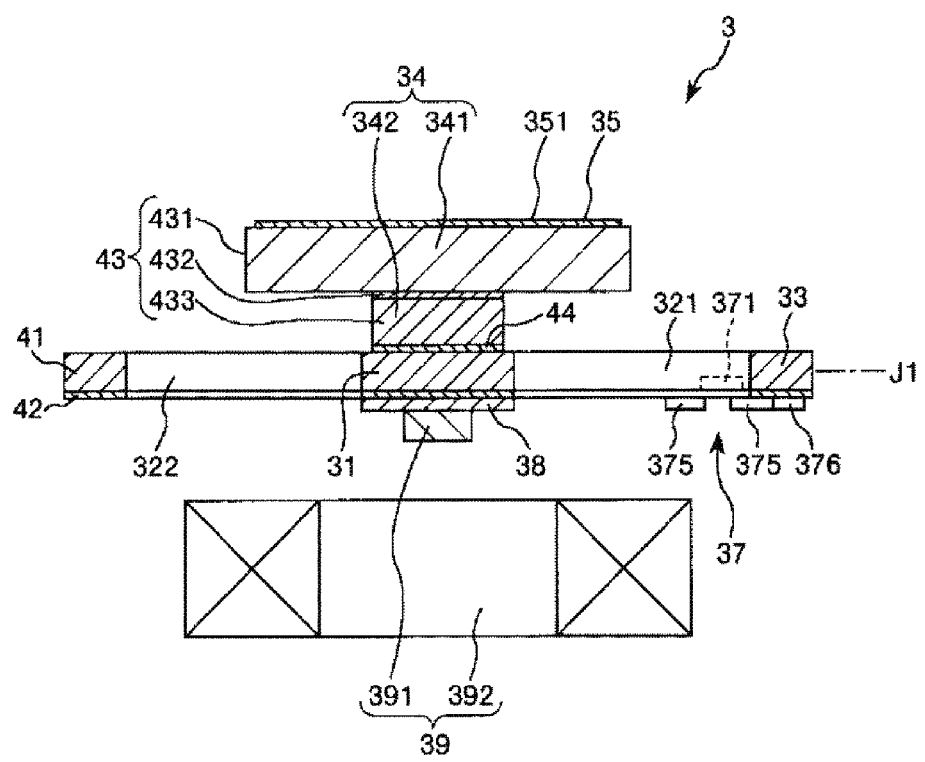
FIG. 3 is a sectional view taken along line A-A in FIG. 2.
Figure 4:
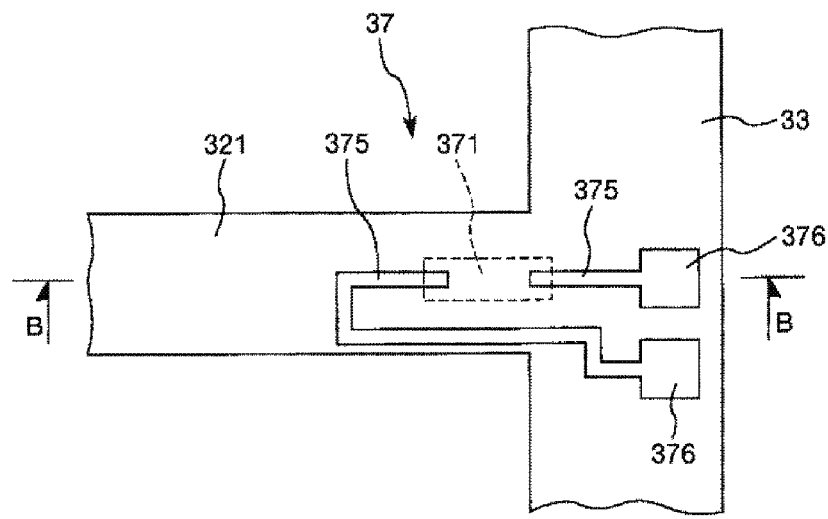
FIG. 4 is a plan view (a bottom view) showing a sensor section included in the optical scanner.
Figure 5:
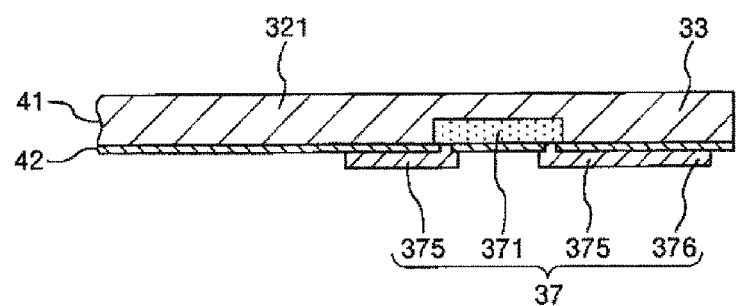
FIG. 5 is a sectional view taken along line B-B in FIG. 4.
Figure 6:
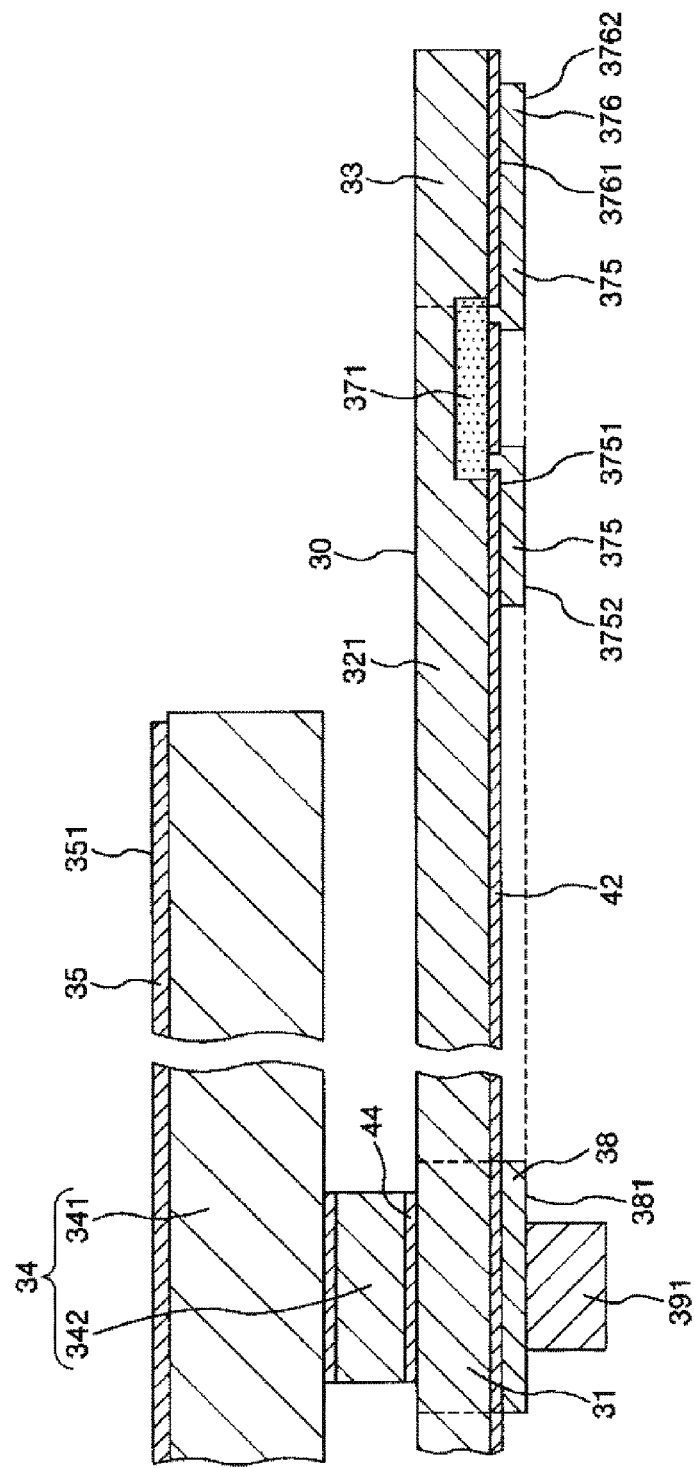
FIG. 6 is a sectional view showing a projecting section and wires included in the optical scanner.
Figure 7:
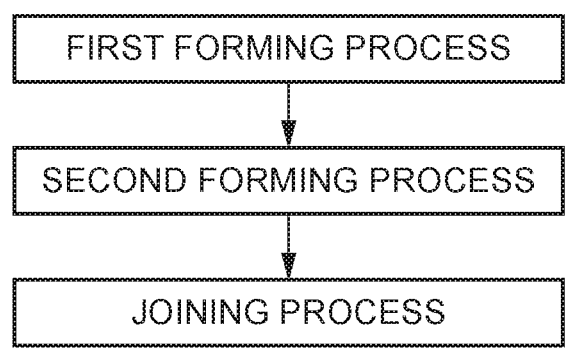
FIG. 7 is a flowchart for explaining a manufacturing method for the optical scanner shown in FIG. 2.

FIG. 1 is a configuration diagram of the image display device according to the first embodiment of the invention. FIG. 2 is a plan view (a top view) of an optical scanner included in the image display device shown in FIG. 1. FIG. 3 is a sectional view taken along line A-A in FIG. 2. FIG. 4 is a plan view (a bottom view) showing a sensor section included in the optical scanner. FIG. 5 is a sectional view taken along line B-B in FIG. 4. FIG. 6 is a sectional view showing a projecting section and wires included in the optical scanner. FIG. 7 is a flowchart for explaining a manufacturing method for the optical scanner shown in FIG. 2. FIGS. 8 to 20 are respectively sectional views for explaining the manufacturing method for the optical scanner shown in FIG. 2. Note that, in the following explanation, for convenience of explanation, the upper side in FIG. 2 is referred to as "upper" as well and a lower side in FIG. 2 is referred to as "lower" as well.

An image display device 1 shown in FIG. 1 is a device that two-dimensionally scans a laser LL for drawing on a target object 10 such as a screen or a wall surface to display an image.

The image display device 1 includes a light source unit 2 that emits the laser LL for drawing and two optical scanners 3 that scan the laser LL emitted from the light source unit 2. The two optical scanners 3 are disposed such that scanning directions (axes J1 explained below) of the laser are orthogonal. For example, one optical scanner 3 scans the laser LL in the horizontal direction and, subsequently, the other optical scanner 3 scans the laser LL in the vertical direction to display a two-dimensional image on the target object 10.

Light Source Unit

The light source unit 2 includes, as shown in FIG. 1, a light source section including laser beam sources 21R, 21G, and 21B for respective colors of red, green, and blue, driving circuits 22R, 22G, and 22B that drive the laser beam sources 21R, 21G, and 21B, collimator lenses 24R, 24G, and 24B that collimate laser beams emitted from the laser beam sources 21R, 21G, and 21B, a light combining section 23, and a condensing lens 26.

The laser beam source 21R emits red light. The laser beam source 21G emits green light. The laser beam source 21B emits blue light. By using the three color lights, it is possible to display a full-color image. Note that the laser beam sources 21R, 21G, and 21B are not particularly limited. However, for example, a laser diode, an LED, and the like can be used.

The driving circuit 22R drives the laser beam source 21R. The driving circuit 22G drives the laser beam source 21G. The driving circuit 22B drives the laser beam source 21B. The driving by the driving circuits 22R, 22G, and 22B is independently controlled by a not-shown control section. The three laser beams emitted from the laser beam sources 21R, 21G, and 21B driven by the driving circuits 22R, 22G, and 22B are respectively collimated by the collimator lenses 24R, 24G, and 24B and made incident on the light combining section 23.

The light combining section 23 combines the lights from the laser beam sources 21R, 21G, and 21B. The light combining section 23 includes three dichroic mirrors 23R, 23G, and 23B. The dichroic mirror 23R has a function of reflecting the red light. The dichroic mirror 23G has a function of transmitting the red light and reflecting the green light. The dichroic mirror 23B has a function of transmitting the red light and the green light and reflecting the blue light.

The three color lights of the red light, the green light, and the blue light from the laser beam sources 21R, 21G, and 21B are combined by the dichroic mirrors 23R, 23G, and 23B. In this case, the intensities of the lights emitted from the laser beam sources 21R, 21G, and 21B are respectively independently modulated by the control section, whereby a laser LL (light) for drawing having a predetermined color is generated. After the numerical aperture of the laser LL generated in this way is changed to a desired NA (numerical aperture) by the condensing lens 26, the laser LL is led to the optical scanner 3.

The light source unit 2 is explained above. However, the configuration of the light source unit 2 is not limited to the configuration in this embodiment as long as the light source unit 2 can generate the laser LL.

Optical Scanner

The optical scanner 3 includes, as shown in FIG. 1, a light reflection surface 351 capable of swinging around an axis J1. The optical scanner 3 reflects the laser LL on the light reflection surface 351 to one-dimensionally scan the laser LL. The optical scanner 3 is explained in detail below. Note that, in the following explanation, a plan view viewed from the normal direction of the light reflection surface 351 in a stationary state is simply referred to as "plan view" as well.

The optical scanner 3 includes, as shown in FIGS. 2 and 3, a structure 30 including a movable section 31, elastically deformable shaft sections 321 and 322 that support the movable section 31 to be capable of swinging (turning) around the axis J1, a supporting section 33 that supports the shaft sections 321 and 322, and a holding section 34 fixed to the upper surface of the movable section 31, a light reflecting section 35 held by the holding section 34, a sensor section 37 that detects a swing angle (a tilt) of the movable section 31, a projecting section 38 provided in the movable section 31, and a driving section 39 that swings the movable section 31 around the axis J1.

The movable section 31 is formed in a tabular shape. The shape in a plan view of the movable section 31 is not particularly limited. However, in this embodiment, the shape is a circular shape.

The shaft sections 321 and 322 are disposed on opposite sides each other with respect to the movable section 31 in the plan view of the movable section 31. The shaft sections 321 and 322 respectively extend along the axes J1. One end portions of the shaft sections 321 and 322 are connected to the movable section 31 and the other end portions are connected to the supporting section 33. The shaft sections 321 and 322 support the movable section 31 to be capable of swinging around the axis J1. The shaft sections 321 and 322 are twisted and deformed according to the swinging of the movable section 31 around the axis J1. Note that the shape of the shaft sections 321 and 322 is not limited to the shape in this embodiment as long as the shaft sections 321 and 322 can support the movable section 31 to be capable of swinging around the axis J1.

The supporting section 33 is formed in a frame shape and disposed to surround the movable section 31 and the shaft sections 321 and 322 in plan view. In other words, the movable section 31 and the shaft sections 321 and 322 are disposed on the inner side of the supporting section 33. The supporting section 33 is connected to the shaft sections 321 and 322 and supports the shaft sections 321 and 322. Note that the shape of the supporting section 33 is not particularly limited. For example, a portion for supporting the shaft section 321 and a portion for supporting the shaft section 322 may be separated. The supporting section 33 may be formed thicker than the movable section 31 and the shaft sections 321 and 322.

As shown in FIG. 3, the holding section 34 is joined to the upper surface of the movable section 31. The holding section 34 includes a base section 341 and a coupling section 342 located between the base section 341 and the movable section 31 to couple the base section 341 and the movable section 31. The holding section 34 is joined to the movable section 31 by pressurizing and joining via a joining member 44 formed of a metal film. Since the holding section 34 and the movable section 31 are pressurized and joined via the joining member 44 in this way, it is possible to more firmly join the holding section 34 and the movable section 31. Note that it is also possible to more firmly join the holding section 34 and the joining member 44 by providing an adhesion layer formed of Ti or the like between the holding section 34 and the joining member 44 or between the movable section 31 and the joining member 44.

The base section 341 is separated from the movable section 31 and the shaft sections 321 and 322 in the plate thickness direction and provided to overlap the shaft sections 321 and 322 in a plan view of the base section 341. In other words, the coupling section 342 is provided between the base section 341 and the movable section 31. In the plan view of the base section 341, at least a part of the coupling section 342 and the shaft sections 321 and 322 is covered with the base section 341. The light reflecting section 35 is held on the upper surface of the base section 341. The light reflecting section 35 has light reflectivity. The surface of the light reflecting section 35 is formed as the light reflection surface 351 that reflects the laser LL. Therefore, the laser LL made incident on the light reflection surface 351 is reflected on the light reflection surface 351 and scanned in a direction corresponding to the posture of the light reflection surface 351. The light reflecting section 35 can be formed of a metal film of aluminum or the like.

Since the holding section 34 is provided and the light reflecting section 35 is disposed in the holding section 34 in this way, it is possible to exhibit effects explained below. When the configuration explained above is adopted, since it is unnecessary to provide the light reflecting section 35 in the movable section 31, it is possible to reduce the movable section 31 in size. Accordingly, it is possible to reduce the distance between the shaft sections 321 and 322. Therefore, it is possible to reduce the optical scanner 3 in size. Since the base section 341 shifts in the plate thickness direction with respect to (is provided to be separated in the plate thickness direction from) the shaft sections 321 and 322, it is possible to increase the base section 341 in size without hindering the twisting deformation of the shaft sections 321 and 322. Therefore, it is possible to increase the light reflection surface 351 in size. Since the holding section 34 is provided in this way, it is possible to achieve a reduction in the size of the optical scanner 3 while increasing the light reflection surface 351 in size.

The structure 30 is explained above. The movable section 31, the shaft sections 321 and 322, and the supporting section 33 in the structure 30 can be integrally formed by, for example, etching an Si substrate 41. Note that, in this embodiment, an insulating layer 42 is provided on the lower surface of the Si substrate 41. The insulating layer 42 is provided mainly for securing insulation of wires 375 and a terminal 376 of the sensor section 37 explained below. Note that the Si substrate 41 may include the insulating layer 42.

In the structure 30, the holding section 34 can be formed by, for example, etching an SOI substrate 43 [a substrate obtained by stacking a first Si layer (a device layer) 431, an $SiO_2$ layer (a box layer) 432, and a second Si layer (a handle layer) 433 in this order]. Specifically, the holding section 34 can be formed by forming the base section 341 of the holding section 34 from the first Si layer 431 and forming the coupling section 342 from the $SiO_2$ layer 432 and the second Si layer 433. The structure 30 is obtained by joining the coupling section 342 and the movable section 31 via the joining member 44. The constituent material of and the forming method for the sections of the structure 30 are not limited to the above.

The driving section 39 includes, as shown in FIG. 3, a permanent magnet 391 provided on the lower surface of the movable section 31 (accurately, the lower surface of the projecting section 38) and a coil 392 disposed to be opposed to the permanent magnet 391 to generate a magnetic field acting on the permanent magnet 391. The permanent magnet 391 is disposed such that, in plan view, an S pole is located on one side of the axis J1 and an N pole is located on the other side. As such a permanent magnet 391, for example, a neodymium magnet, a ferrite magnet, a samarium cobalt magnet, an alnico magnet, and a bond magnet can be suitably used. In the driving section 39, it is possible to swing the movable section 31 around the axis J1 by applying an alternating voltage to the coil 392.

Concerning an optical scanner for horizontal scanning 3' of the two optical scanners 3, the movable section 31 is desirably swung by resonant driving. Consequently, it is possible to increase a swing angle of the movable section 31 around the axis J1. Note that the frequency of the resonant driving is not particularly limited. However, the frequency of the resonant driving is desirably, for example, approximately 10 to 40 kHz. On the other hand, concerning an optical scanner for vertical scanning 3", the movable section 31 is desirably swung by non-resonant driving. The frequency of the non-resonant driving is not particularly limited. However, the frequency of the non-resonant driving is desirably, for example, approximately 30 to 120 Hz (approximately 60 Hz).

The sensor section 37, which detects the swing angle of the movable section 31, is provided on the lower surface (a surface on the opposite side of the holding section 34) of the shaft section 321 and in a connecting section to the supporting section 33 as shown in FIGS. 4 and 5. Since the sensor section 37 is provided on the lower surface of the shaft section 321, it is easy to form the sensor section 37.

The sensor section 37 includes a piezoelectric resistance section 371, the wires 375 connected to the piezoelectric resistance section 371, and the terminal 376 connected to the wires 375. A resistance value of the piezoelectric resistance section 371 changes according to twisting deformation of the shaft section 321. Therefore, it is possible to detect a twisting amount of the shaft section 321 from the resistance value change of the piezoelectric resistance section 371. Further, it is possible to detect a swing angle of the movable section 31 around the axis J1 from the twisting amount of the shaft section 321.

The piezoelectric resistance section 371 can be formed by doping (diffusing or injecting) impurities to Si such as phosphorus or boron into the lower surface of the Si substrate 41. The wires 375 and the terminal 376 can be formed by patterning a metal film disposed on the insulating layer 42.

Note that the configuration of the sensor section 37 is not particularly limited as long as the sensor section 37 can detect the swing angle of the movable section 31. For example, the sensor section 37 may have a configuration in which four piezoelectric resistance sections 371 are disposed and a bridge circuit (a Wheatstone bridge circuit) is formed by the piezoelectric resistance sections 371.

As shown in FIGS. 3 and 6, the projecting section 38 is provided on the lower surface (a surface on the opposite side of the holding section 34) of the movable section 31. The projecting section 38 has a function of protecting the wires 375 and the terminal 376 of the sensor section 37 from pressure applied during manufacturing. Note that the function of the projecting section 38 is explained in detail below in explanation of a manufacturing method for the optical scanner 3.

As shown in FIG. 6, the lower surface (a surface on the opposite side of a surface of the projecting section 38 in contact with the structure 30, in other words, a surface on the opposite side of a surface in contact with the insulating layer 42 provided on the Si substrate 41) 381 of the projecting section 38 is located further on the lower side (the opposite side of a surface in contact with the structure 30, in other words, a surface on the opposite side of the surface in contact with the insulating layer 42 provided on the Si substrate 41) than upper surfaces (surfaces on a side in contact with the structure 30, in other words, surfaces in contact with the insulating layer 42 provided on the Si substrate 41) 3751 and 3761 of the wires 375 and the terminal 376. Further, the lower surface 381 of the projecting section 38 is located substantially flush with lower surfaces (surfaces on the opposite side of surfaces in contact with the structure 30, in other words, surfaces on the opposite side of surfaces in contact with the insulating layer 42 provided on the Si substrate 41) 3752 and 3762 of the wires 375 and the terminal 376.

The projecting section 38 is formed together with the wires 375 and the terminal 376 by patterning the metal film disposed on the insulating layer 42. Since the projecting section 38 is formed from the same metal layer from which the wires 375 and the terminal 376 are formed in this way, it is easy to form the projecting section 38.

However, the configuration of the projecting section 38 is not particularly limited. For example, the projecting section 38 does not have to be formed together with the wires 375 and the terminal 376. The projecting section 38 may be formed of a material different from the material of the wires 375 and the terminal 376. The material of the projecting section 38 is not particularly limited. However, the material of the projecting section 38 is desirably a material having a Young's modulus equal to or larger than the Young's modulus of the wires 375 and the terminal 376. Consequently, it is possible to form the projecting section 38 sufficiently hard.

The structure of the optical scanner 3 is explained above.

A manufacturing method for the optical scanner 3 is explained with reference to FIGS. 7 to 20. The manufacturing method for the optical scanner 3 includes, as shown in FIG. 7, a first forming process, a second forming process, and a joining process.

First Forming Process

Figure 8:
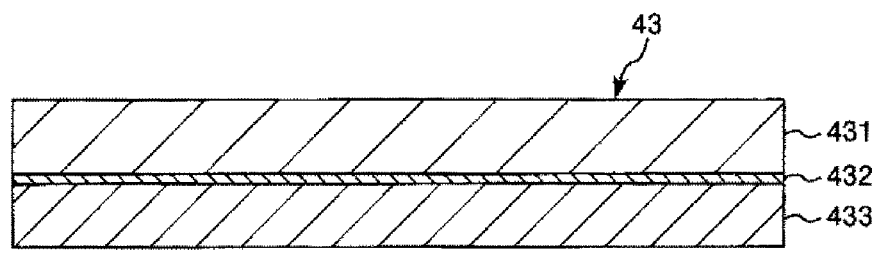
FIG. 8 is a sectional view for explaining the manufacturing method for the optical scanner shown in FIG. 2.
Figure 9:
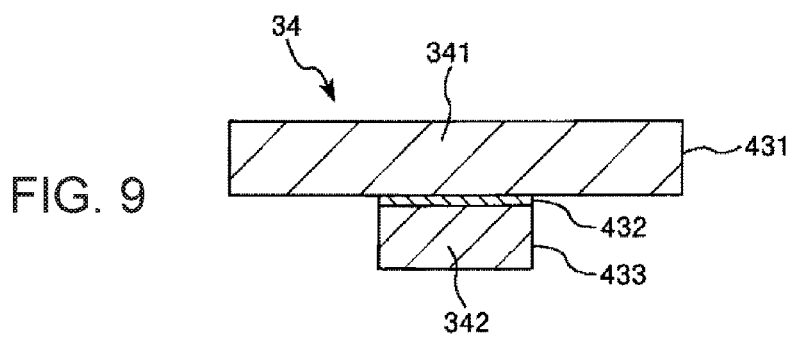
FIG. 9 is a sectional view for explaining the manufacturing method for the optical scanner shown in FIG. 2.
Figure 10:
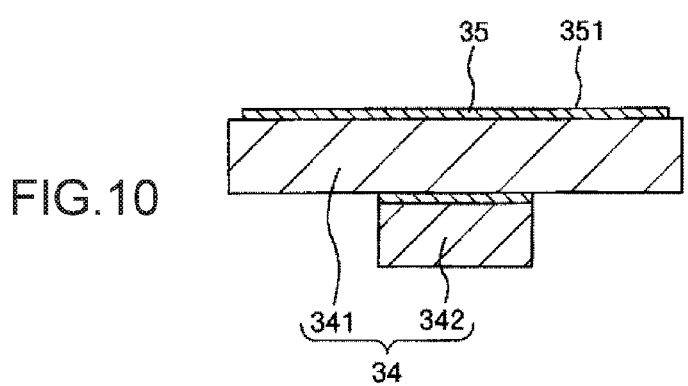
FIG. 10 is a sectional view for explaining the manufacturing method for the optical scanner shown in FIG. 2.

First, as shown in FIG. 8, the SOI substrate 43 in which the first Si layer 431, the SiO$_2$ layer 432, and the second Si layer 433 are stacked in this order is prepared (step 1). Subsequently, as shown in FIG. 9, the first Si layer 431 is patterned by etching (wet etching, dry etching, etc.) to form the base section 341. The second Si layer 433 and the SiO$_2$ layer 432 are patterned by etching to form the coupling section 342 (step 2). Consequently, the holding section 34 is obtained. Subsequently, as shown in FIG. 10, an Al film is formed on the base section 341 to form the light reflecting section 35 (step 3).

Note that the order of step 3 is not particularly limited. Step 3 may be performed prior to step 2 or may be performed after step 2 (e.g., after the joining process).

Second Forming Process

Figure 11:
FIG. 11 is a sectional view for explaining the manufacturing method for the optical scanner shown in FIG. 2.
Figure 12:
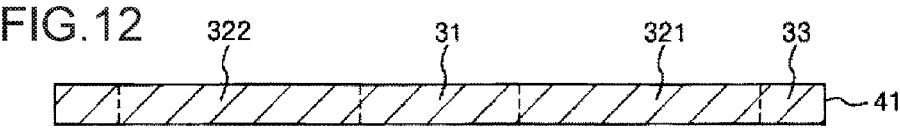
FIG. 12 is a sectional view for explaining the manufacturing method for the optical scanner shown in FIG. 2.
Figure 13:
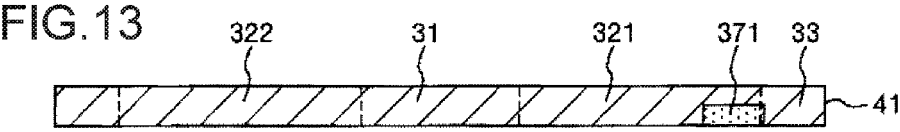
FIG. 13 is a sectional view for explaining the manufacturing method for the optical scanner shown in FIG. 2.

First, as shown in FIG. 11, the Si substrate 41 is prepared (step 4). Subsequently, as shown in FIG. 12, the Si substrate 41 is patterned by etching to form the movable section 31, the shaft sections 321 and 322, and the supporting section 33 (step 5). Subsequently, as shown in FIG. 13, phosphorus, boron, or the like is doped into the lower surface of the Si substrate 41 and into the connecting section to the supporting section 33 of the shaft section 321 to form the piezoelectric resistance section 371 (step 6).

Figure 14:
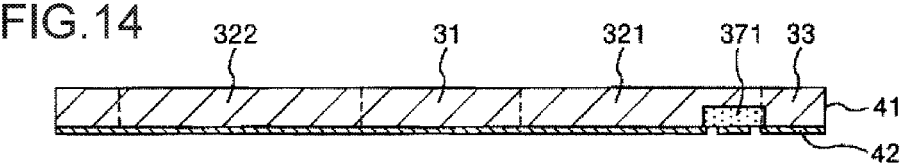
FIG. 14 is a sectional view for explaining the manufacturing method for the optical scanner shown in FIG. 2.

Subsequently, as shown in FIG. 14, the insulating layer 42 is formed on the lower surface of the Si substrate (step 7). The insulating layer 42 is not particularly limited. However, the insulating layer 42 can be configured by, for example, a stacked body of an SiO$_2$ layer and an SiN layer. Note that the insulating layer 42 includes a through-hole (a via hole) in a position overlapping the piezoelectric resistance section 371.

Figure 15:
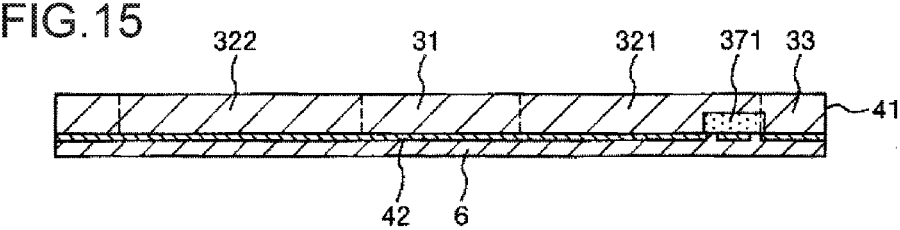
FIG. 15 is a sectional view for explaining the manufacturing method for the optical scanner shown in FIG. 2.
Figure 16:
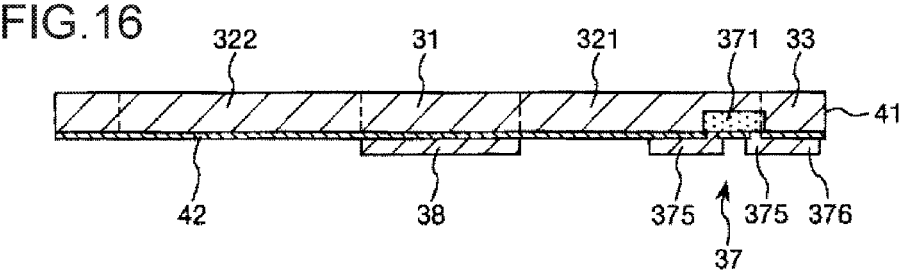
FIG. 16 is a sectional view for explaining the manufacturing method for the optical scanner shown in FIG. 2.

Subsequently, as shown in FIG. 15, a metal film 6 is formed on the insulating layer 42 (step 8). The metal film 6 is not particularly limited. The metal film 6 can be, for example, a stacked body obtained by stacking an Au layer on a base layer formed by a Cr layer. Subsequently, the metal film 6 is patterned by etching to form the projecting section 38, the wires 375, and the terminal 376 as shown in FIG. 16 (step 9). Since the projecting section 38, the wires 375, and the terminal 376 are collectively formed from the metal film 6 in this way, it is possible to easily locate the lower surfaces of these sections substantially flush with each other.

Note that step 5 may be performed after step 9. That is, the movable section 31, the shaft sections 321 and 322, and the supporting section 33 may be formed after the sensor section 37 is formed. Step 5 may be performed after the next joining process. That is, the movable section 31, the shaft sections 321 and 322, and the supporting section 33 may be formed after the Si substrate 41 and the SOI substrate 43 are joined.

Joining Process

Figure 17:
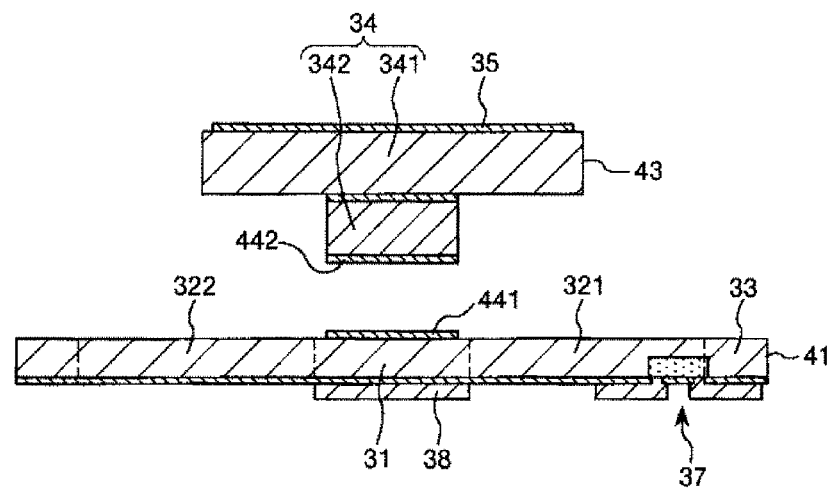
FIG. 17 is a sectional view for explaining the manufacturing method for the optical scanner shown in FIG. 2.

First, as shown in FIG. 17, a metal film 441 functioning as a joining member is formed on the upper surface (a surface on the opposite side of the projecting section 38) of the movable section 31. A metal film 442 functioning as a joining member is formed on the lower surface (a surface on the opposite side of the base section 341) of the coupling section 342. Note that the metal films 441 and 442 are not particularly limited as long as the movable section 31 and the coupling section 342 can be joined. However, for example, the metal films 441 and 442 can be, for example, a stacked body obtained by stacking an Au layer on a base layer formed by a Cr layer. The metal films 441 and 442 may be a single Al layer.

Figure 18:
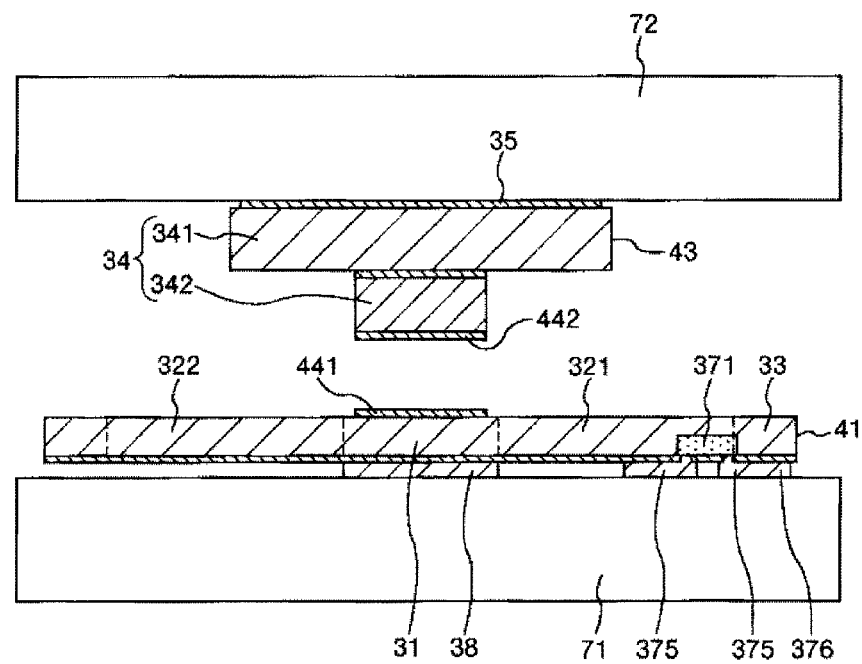
FIG. 18 is a sectional view for explaining the manufacturing method for the optical scanner shown in FIG. 2.
Figure 19:
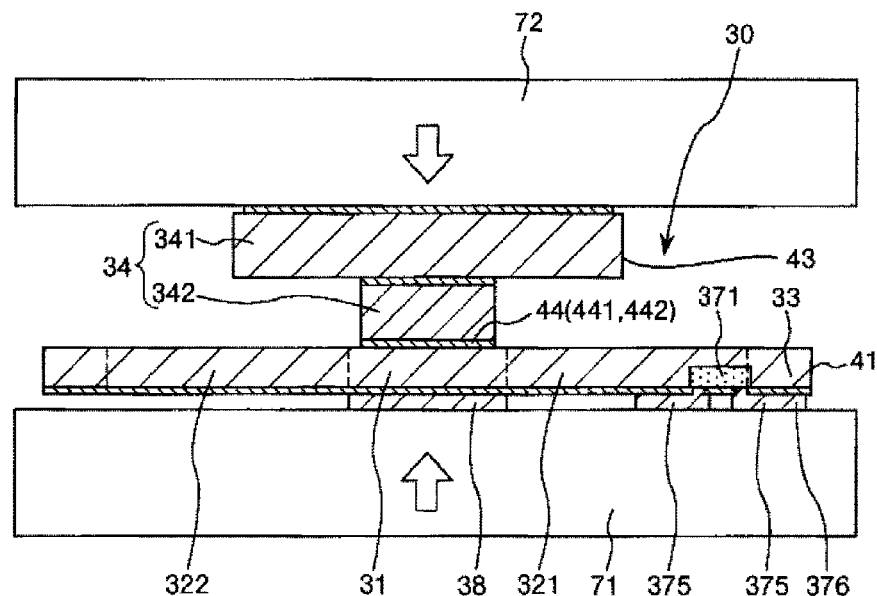
FIG. 19 is a sectional view for explaining the manufacturing method for the optical scanner shown in FIG. 2.
Figure 20:
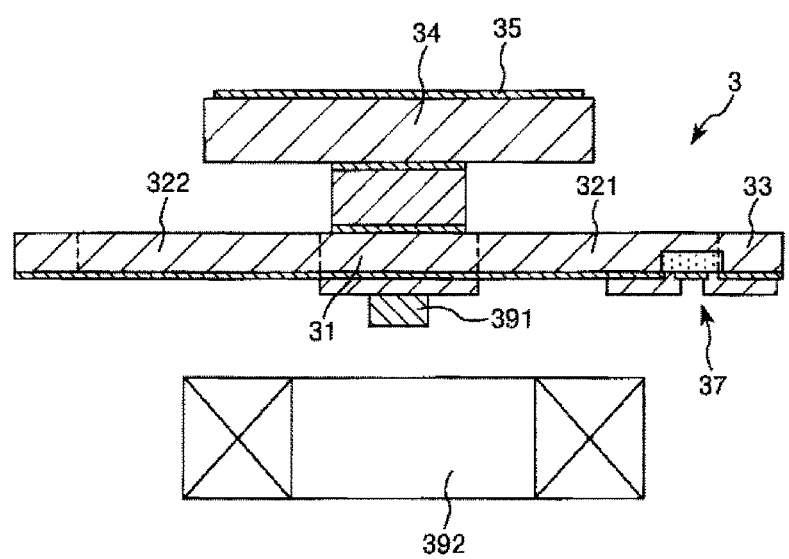
FIG. 20 is a sectional view for explaining the manufacturing method for the optical scanner shown in FIG. 2.

Subsequently, as shown in FIG. 18, the Si substrate 41 is placed on a lower stage 71. The SOI substrate 43 (the holding section 34) is placed on an upper stage 72. As shown in FIG. 19, the Si substrate 41 and the SOI substrate 43 are pressed by the lower stage 71 and the upper stage 72 while being heated to pressurize and join the movable section 31 and the coupling section 342 via the meal films 441 and 442. Consequently, the structure 30 is obtained. Further, as shown in FIG. 20, the permanent magnet 391 is provided on the lower surface of the movable section 31 and the coil 392 is disposed to be opposed to the permanent magnet 391. Consequently, the optical scanner 3 is obtained.

In the invention, since the projecting section 38 is provided on the lower surface of the movable section 31, it is possible to receive, in the projecting section 38, at least a part of pressure received by the Si substrate 41 and the SOI substrate 43 when the Si substrate 41 and the SOI substrate 43 are pressed by the lower stage 71 and the upper stage 72. It is possible to reduce pressure received by the wires 375 and the terminal 376. Therefore, it is possible to suppress crush of the wires 375 and the terminal 376. Consequently, it is possible to suppress, for example, a resistance value increase and breakage (rupture) of the wires 375 due to the crush and contact (short circuit) of the wires 375 adjacent to each other due to the crush and expansion. It is possible to suppress a failure of the sensor section 37.

Since the projecting section 38 is provided, when the Si substrate 41 and the SOI substrate 43 are pressed by the lower stage 71 and the upper stage 72, it is possible to support the movable section 31 from the lower side. It is possible to sufficiently apply pressure to the movable section 31 and the coupling section 342. Therefore, it is possible to more surely and firmly join the movable section 31 and the coupling section 342. Therefore, it is possible to manufacture the optical scanner 3 excellent in mechanical strength.

Note that, in this embodiment, the lower surface 381 of the projecting section 38 is located flush with the lower surfaces 3752 and 3762 of the wires 375 and the terminal 376. However, the lower surface 381 of the projecting section 38 may be located above (further on the structure 30 side than) the lower surfaces 3752 and 3762 of the wires 375 and the terminal 376. With such a configuration, it is also possible to sufficiently exhibit the effects explained above compared with when the projecting section 38 is not provided.

Second Embodiment

An image display device according to a second embodiment of the invention is explained.

Figure 21:
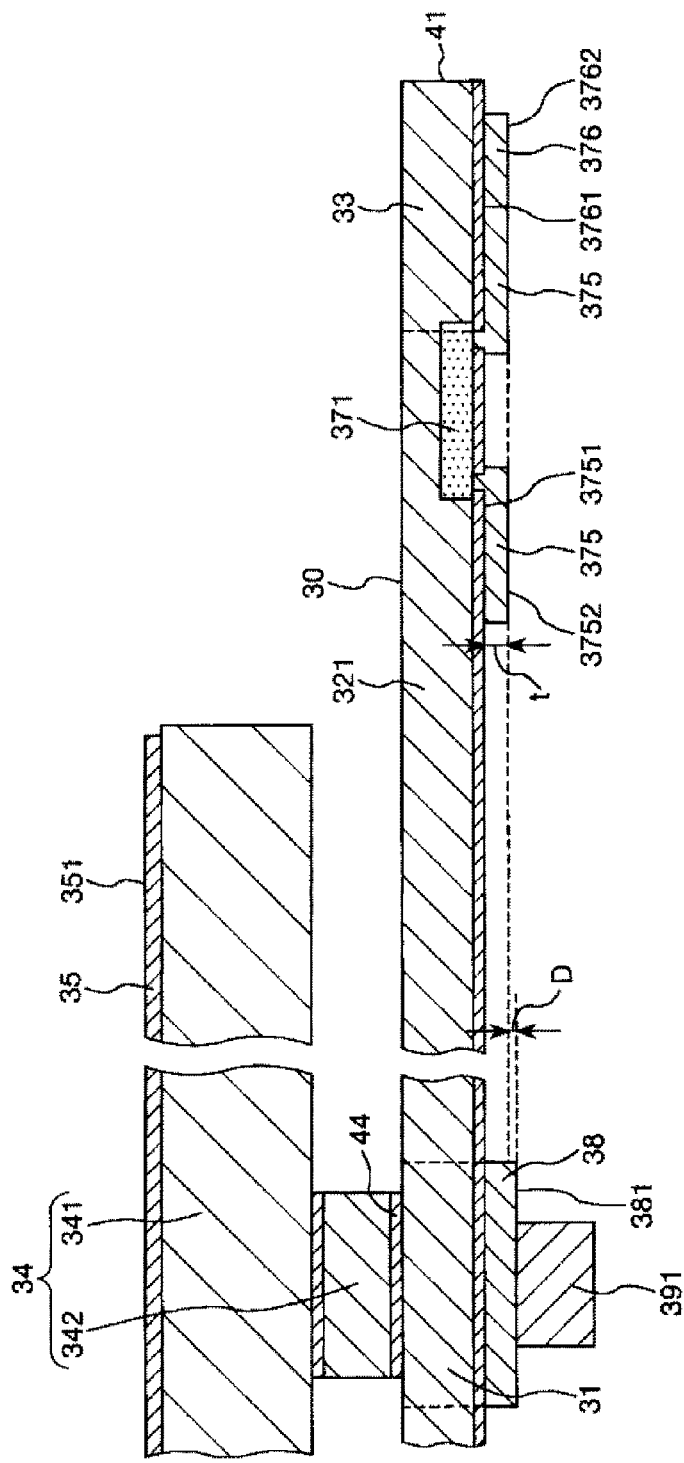
FIG. 21 is a sectional view showing an optical scanner according to a second embodiment of the invention.

FIG. 21 is a sectional view showing an optical scanner according to the second embodiment of the invention.

Concerning the image display device according to the second embodiment, differences from the first embodiment are mainly explained. Explanation of similarities is omitted.

The image display device according to the second embodiment is the same as the image display device according to the first embodiment except that the configuration of the optical scanner is different. Note that components same as the components in the first embodiment are denoted by the same reference numerals.

In the optical scanner 3 shown in FIG. 21, the projecting section 38 is formed thicker than the wires 375 and the terminal 376. Therefore, the lower surface 381 of the projecting section 38 is located further on the lower side than the lower surfaces 3752 and 3762 of the wires 375 and the terminal 376 (in positions further away from the structure 30 than the lower surfaces 3752 and 3762).

By adopting such a structure, it is possible to further reduce pressure received by the wires 375 and the terminal 376 when the wires 375 and the terminal 376 are pressed by the lower stage 71 and the upper stage 72 (when the movable section 31 and the coupling section 342 are pressurized and joined). Therefore, it is possible to suppress crush of the wires 375 and the terminal 376. When the wires 375 and the terminal 376 are pressed by the lower stage 71 and the upper stage 72, it is possible to effectively support the movable section 31 with the projecting section 38 from the lower side. It is possible to sufficiently apply pressure to the movable section 31 and the coupling section 342. Therefore, it is possible to more surely and firmly join the movable section 31 and the coupling section 342.

Note that a clearance D in the thickness direction of the movable section 31 between the lower surface 381 of the projecting section 38 and the lower surfaces 3752 and 3762 of the wires 375 and the terminal 376 is not particularly limited. However, the clearance D is desirably smaller than thickness t of the wires 375 and the terminal 376. That is, the clearance D desirably satisfies a relation D<t. When such a relation is satisfied, it is possible to prevent excessive downward projection of the projecting section 38. For example, it is possible to suppress bend and warp of the Si substrate 41 when the wires 375 and the terminal 376 are pressed by the lower stage 71 and the upper stage 72 (when the movable section 31 and the coupling section 342 are pressurized and joined). Therefore, it is possible to effectively suppress deformation and breakage of the Si substrate 41.

According to the second embodiment, it is possible to exhibit effects same as the effects in the first embodiment explained above.

Third Embodiment

An image display device according to a third embodiment of the invention is explained.

Figure 22:
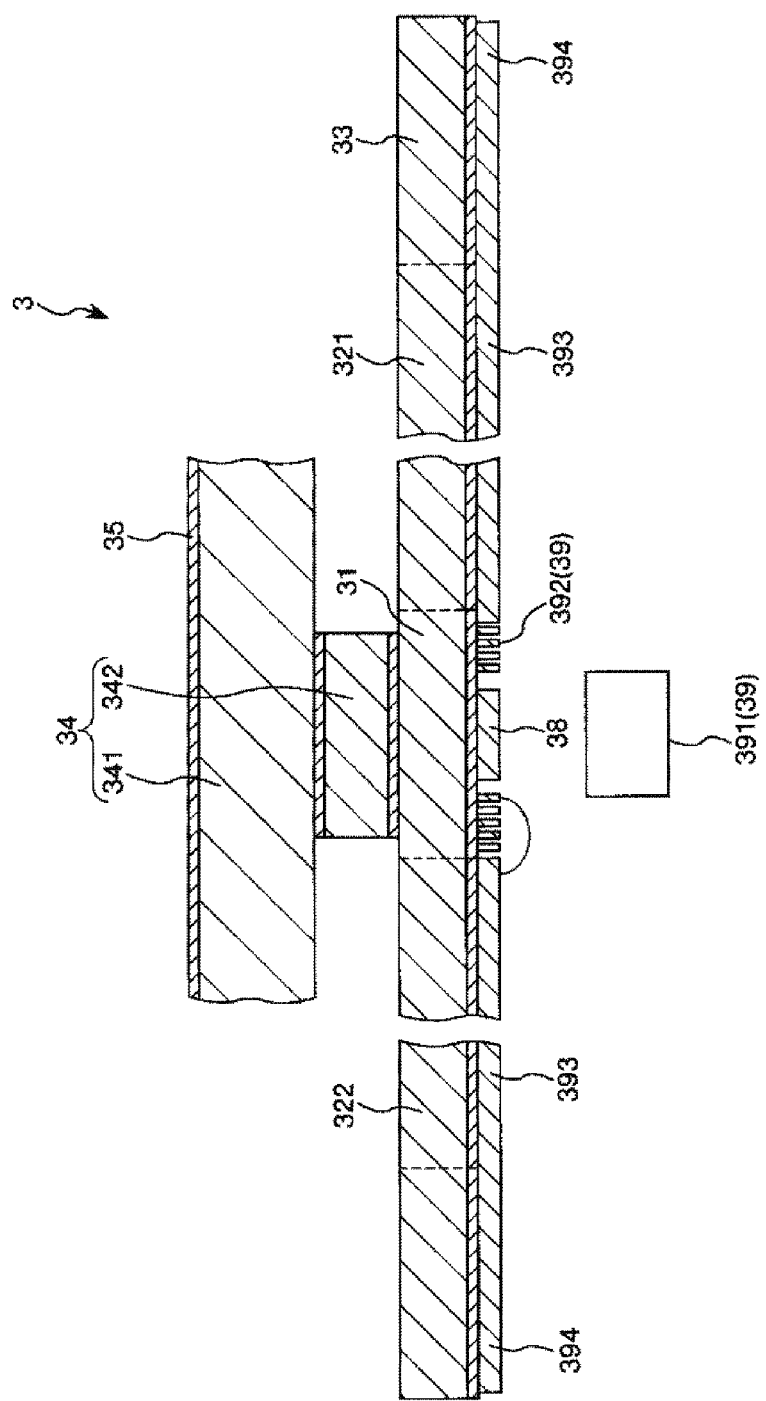
FIG. 22 is a sectional view showing an optical scanner according to a third embodiment of the invention.
Figure 23:
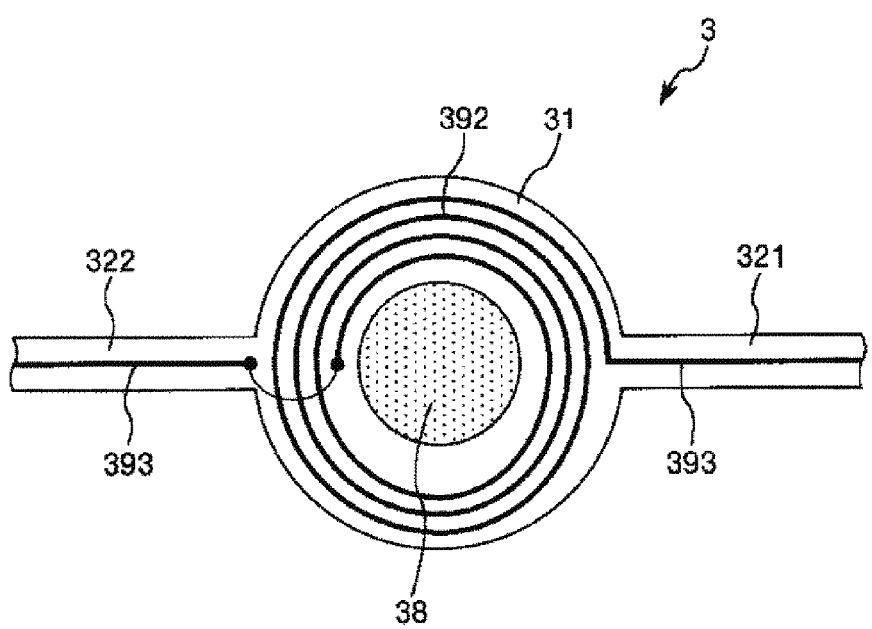
FIG. 23 is a plan view (a bottom view) of the optical scanner shown in FIG. 22.

FIG. 22 is a sectional view showing an optical scanner according to the third embodiment of the invention. FIG. 23 is a plan view (a bottom view) of the optical scanner shown in FIG. 22. Note that, for convenience of explanation, illustration of the sensor section 37 is omitted in FIGS. 22 and 23.

Concerning the image display device according to the third embodiment, differences from the embodiments explained above are mainly explained. Explanation of similarities is omitted.

The image display device according to the third embodiment of the invention is the same as the image display device according to the first embodiment except that the configuration of the optical scanner is different. Note that components same as the components in the embodiments are denoted by the same reference numerals.

In the scanner 3 shown in FIGS. 22 and 23, the disposition of the permanent magnet 391 and the coil 392 of the driving section 39 is opposite to the disposition in the first embodiment. That is, the coil 392 is disposed on the lower surface of the movable section 31. The permanent magnet 391 is disposed to be opposed to the coil 392. The coil 392 is disposed along the outer circumference of the movable section 31. The projecting section 38 is provided on the inner side of the coil 392. The coil 392 is connected to a terminal 394 disposed on the lower surface of the supporting section 33 via a wire 393 disposed on the lower surfaces of the shaft sections 321 and 322 and the supporting section 33.

By adopting such a configuration, it is possible to further reduce pressure received by the coil 392, the wire 393, and the terminal 394 when the coil 392, the wire 393, and the terminal 394 are pressed by the lower stage 71 and the upper stage 72 (when the movable section 31 and the coupling section 342 are pressurized and joined). Therefore, it is possible to suppress crush of the coil 392, the wire 393, and the terminal 394. It is possible to suppress a failure of the driving section 39.

According to the third embodiment, it is possible to exhibit effects same as the effects in the first embodiment explained above.

Fourth Embodiment

A head-up display according to a fourth embodiment of the invention is explained.

Figure 24:
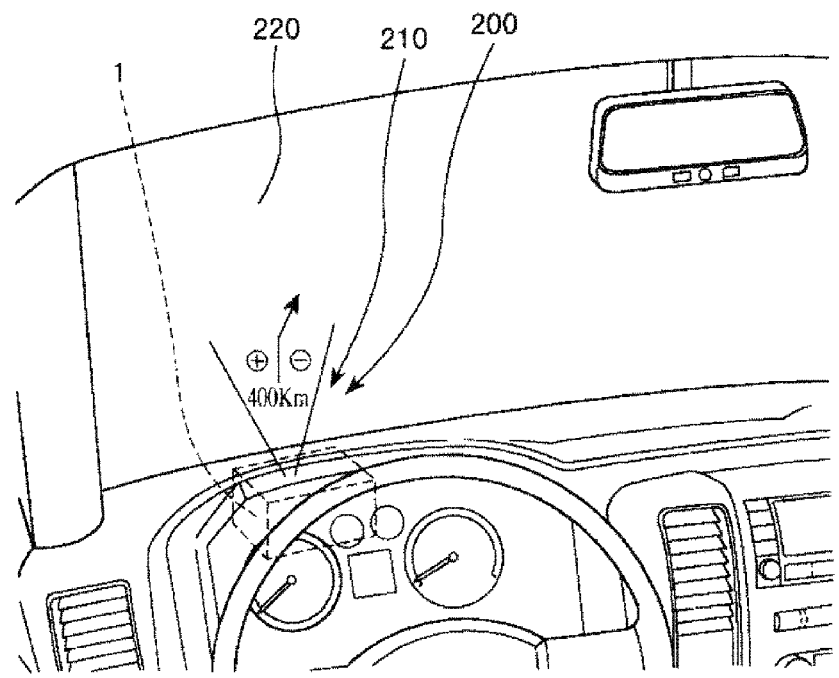
FIG. 24 is a perspective view showing a head-up display applied with an image display device according to the invention.

FIG. 24 is a perspective view showing a head-up display applied with an image display device according to the invention.

As shown in FIG. 24, in ahead-up display system 200, the image display device 1 is mounted on a dashboard of an automobile to configure a head-up display 210. Predetermined images of guide display to a destination, time, orientation, speed, outdoor temperature, weather, and the like can be displayed on a windshield 220 by the head-up display 210. Note that the head-up display system 200 can be applied to not only the automobile but also an airplane, a ship, and the like.

Fifth Embodiment

A head mounted display according to a fifth embodiment of the invention is explained.

Figure 25:
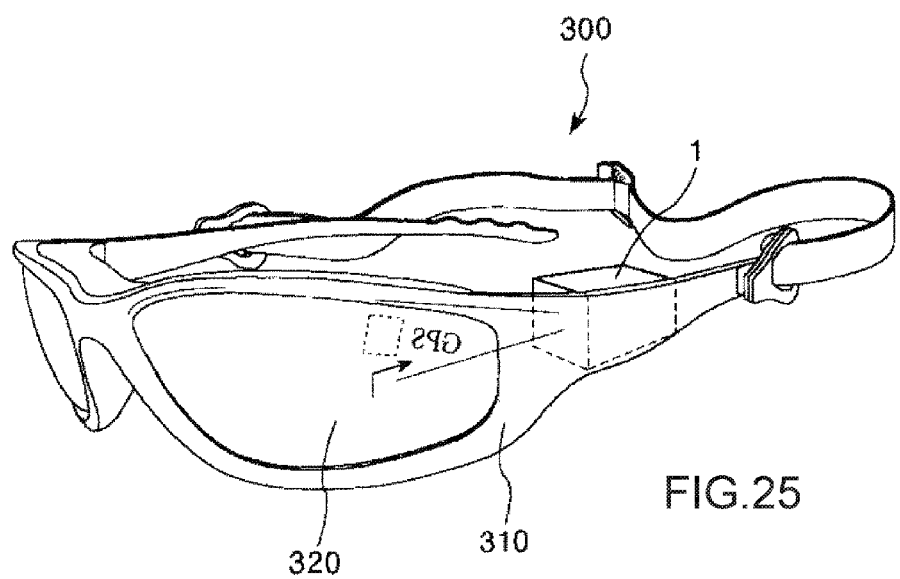
FIG. 25 is a perspective view showing a head mounted display according to the invention.

FIG. 25 is a perspective view showing a head mounted display according to the invention.

As shown in FIG. 25, a head mounted display 300 includes a frame 310 worn on the head of an observer and the image display device 1 mounted on the frame 310. A predetermined image visually recognized by one eye is displayed, by the image display device 1, on a display section (a light reflecting layer) 320 provided in a part, which is originally a lens, of the frame 310.

The display section 320 may be transparent or may be opaque. When the display section 320 is transparent, information from the image display device 1 can be superimposed on information (a scene) from the real world and used. The display section 320 only has to reflect at least a part of incident light. For example, a hologram element, a half mirror, and the like can be used in the display section 320.

The optical scanner, the image display device, and the head mounted display according to the invention are explained above on the basis of the embodiments shown in the figures. However, the invention is not limited to this. The components of the sections can be replaced with any components having the same functions. Any other components may be added to the invention.

In the embodiments, the configuration capable of one-dimensionally scanning a laser (around the axis J1) is explained as the optical scanner. However, the configuration of the optical scanner is not limited to this. For example, the optical scanner may adopt a configuration formed as a so-called "gimbals type", capable of swinging around both axes of a first axis and a second axis orthogonal to the first axis, and capable of two-dimensionally scanning light.

The entire disclosure of Japanese Patent Application No. 2015-155764, filed Aug. 6, 2015 is expressly incorporated by reference herein.

What is claimed is:

1. An optical scanner comprising:
a movable plate having first and second ends opposite to each other in a plan view, the movable plate having first and second surfaces opposite to each other;
a first shaft that linearly extends in a first direction, one end of the first shaft being connected to the first end of the movable plate;
a second shaft that linearly extends in the first direction, one end of the second shaft being connected to the second end of the movable plate;
a support frame that is in a rectangular-ring shape with four sides, the other end of the first shaft being connected to one of the sides of the support frame, the other end of the second shaft being connected to another one of the sides of the support frame so that the movable plate and the first and second shafts are sandwiched by two sides of the support frame and are enclosed by the support frame in the plan view;
a holding base that is joined to the first surface of the movable plate;
a light reflecting member that is provided in the holding base, the light reflecting member having light reflectivity;
a wire that is provided on a surface of the support frame, the surface of the support frame being located on a same plane as the second surface of the movable plate; and
a projection that is provided on the second surface of the movable plate,
wherein the support frame, the movable plate, and the first and second shafts are formed from a monolithic substrate, and
the movable plate is configured to swing around the first and second shafts as a swing axis.

2. The optical scanner according to claim 1,
wherein the monolithic substrate has first and second substrate surfaces opposite to each other, the wire has first and second wire surfaces opposite to each other, and the projection has first and second projection surfaces opposite to each other, the first wire surface is provided on the first substrate surface, and the first projection surface is provided on the first substrate surface, and the second wire surface and the second projection surface are located on a same plane.

3. The optical scanner according to claim 1, wherein the monolithic substrate has first and second substrate surfaces opposite to each other, the wire has first and second wire surfaces opposite to each other, and the projection has first and second projection surfaces opposite to each other, the first wire surface is provided on the first substrate surface, and the first projection surface is provided on the first substrate surface, and the second projection surface is located farther than the second wire surface from the first substrate surface.

4. The optical scanner according to claim 3, wherein a clearance in a thickness direction of the monolithic substrate between the second projection surface and the second wire surface is smaller than a thickness of the wire.

5. The optical scanner according to claim 1, wherein the movable plate and the holding base are joined via a joining member.

6. The optical scanner according to claim 1, wherein the projection and the wire are formed in a same film forming process.

7. An image display device comprising the optical scanner according to claim 1.

8. An image display device comprising the optical scanner according to claim 2.

9. An image display device comprising the optical scanner according to claim 3.

10. An image display device comprising the optical scanner according to claim 4.

11. An image display device comprising the optical scanner according to claim 5.

12. An image display device comprising the optical scanner according to claim 6.

13. A head mounted display comprising:

the optical scanner according to claim 1; and a frame mounted with the optical scanner and worn on a head of an observer.

14. A head mounted display comprising:

the optical scanner according to claim 2; and a frame mounted with the optical scanner and worn on a head of an observer.

15. A head mounted display comprising:

the optical scanner according to claim 3; and a frame mounted with the optical scanner and worn on a head of an observer.

16. A head mounted display comprising:

the optical scanner according to claim 4; and a frame mounted with the optical scanner and worn on a head of an observer.

17. A head mounted display comprising:

the optical scanner according to claim 5; and a frame mounted with the optical scanner and worn on a head of an observer.

18. A head mounted display comprising:

the optical scanner according to claim 6; and a frame mounted with the optical scanner and worn on a head of an observer.

\* \* \* \* \*